United States Patent [19]
Ericson

[11] Patent Number: 6,061,753
[45] Date of Patent: May 9, 2000

[54] APPARATUS AND METHOD OF ACCESSING TARGET DEVICES ACROSS A BUS UTILIZING INITIATOR IDENTIFIERS

[75] Inventor: George M. Ericson, Shrewsbury, Mass.

[73] Assignee: EMC Corporation, Hopkinton, Mass.

[21] Appl. No.: 09/014,064

[22] Filed: Jan. 27, 1998

[51] Int. Cl.[7] .................................................. G06F 13/14
[52] U.S. Cl. ............................................. 710/107; 710/36
[58] Field of Search ..................................... 710/240, 107, 710/36, 200, 110, 113; 711/147

[56] References Cited

U.S. PATENT DOCUMENTS

| | | | |
|---|---|---|---|
| 4,914,656 | 4/1990 | Dunphy, Jr. et al. | 371/10.2 |
| 4,989,205 | 1/1991 | Dunphy, Jr. et al. | 371/10.1 |
| 4,989,206 | 1/1991 | Dunphy, Jr. et al. | 371/10.1 |
| 5,077,736 | 12/1991 | Dunphy, Jr., et al. | 371/10.1 |
| 5,124,987 | 6/1992 | Milligan et al. | 371/10.1 |
| 5,210,844 | 5/1993 | Shimura et al. | 710/100 |
| 5,239,632 | 8/1993 | Larner | 395/325 |
| 5,274,783 | 12/1993 | House et al. | 395/325 |
| 5,297,268 | 3/1994 | Lee et al. | 711/164 |
| 5,548,783 | 8/1996 | Jones et al. | 395/836 |
| 5,634,111 | 5/1997 | Oeda et al. | 395/480 |
| 5,644,789 | 7/1997 | Matthews et al. | 395/856 |

*Primary Examiner*—Glenn A. Auve
*Attorney, Agent, or Firm*—Bromberg & Sunstein LLP

[57] ABSTRACT

A method, apparatus, and computer program product for controlling access to a target device utilizes an initiator identifier to either permit or deny access to a selected portion of the target device. To that end, a message having the initiator identifier is directed from the initiator device to the target device to request access to the selected portion of the target device. Upon receipt by the target device, it is determined if the initiator identifier is in a permitted set of identifiers associated with the selected portion of the target device. If the initiator identifier is in the permitted set, then access to the portion of the target device is permitted and the initiator can access the target in accordance with conventionally known processes.

65 Claims, 5 Drawing Sheets

APPARATUS AND METHOD OF ACCESSING TARGET DEVICES ACROSS A BUS UTILIZING INITIATOR IDENTIFIERS

FIELD OF THE INVENTION

The invention generally relates to computer networks and, more particularly, the invention relates to controlling communication between network devices connected to a bus system.

BACKGROUND OF THE INVENTION

Network devices may be connected with conventional interconnection subsystems such as, for example, a small computer system interface parallel interconnect bus ("SCSI bus"), a SCSI Fibre Channel bus, or an Ethernet based local area network. Devices utilizing a SCSI bus, for example, are configured to comply with the SCSI protocol (e.g., SCSI-1, SCSI-2, or SCSI-3, among others), the specification of which is discussed in "Information Technology—SCSI-3 Architecture Model" X3T 10 994D Revision 18, from the American National Standards Institute ("ANSI", located at 11 West 42nd Street, New York, N.Y.) and in "SCSI-3 Architecture Model (SAM)" X3.270:1996, also available from ANSI. Both such publications are incorporated herein, in their entirety, by reference.

Initiator devices (i.e., devices connected to a bus requesting access to other devices connected to the bus, commonly referred to as "initiators") on a SCSI bus may access other devices (i.e., devices connected to the bus and being accessed by initiators, commonly referred to as "targets") on the bus in accordance with the SCSI protocol. The SCSI protocol specifies that an initiator requesting access to a target must transmit an access message to the target specifying an initiator identifier identifying the initiator, a target identifier identifying the target, and a logical unit number ("LUN") identifying the portion of the target device to be accessed ("logical unit"). The initiator identifier and the target identifier typically identify the physical location (i.e., physical address) of the initiator/target on the bus (e.g., the identification number of the port on the SCSI bus).

As is known by those skilled in the art, different bus protocols set different limits on the maximum number of logical units within a single target that may be accessed by an initiator. For example, a maximum of eight logical units in a single target may be accessed by an initiator connected to a bus system that is utilizing the SCSI-1 and SCSI-2 protocols. Accordingly, the initiator on such bus system may access no more than eight logical units per target. Other logical units in the target thus undesirably are not visible to the initiator. In a similar manner, a maximum of $2^{64}$ logical units are visible to an initiator when using the SCSI Fibre Channel protocol on conventional systems.

One system implementation utilizing a SCSI bus, for example, may include a target controller operating a central disk array that is used to store information for several host computer systems. Accordingly, in a disk array having hundreds of disks that each operate as separate logical units, bus systems using the SCSI-1 or SCSI-2 bus protocol grossly underutilize the disk array because only eight of the disks in the array may be accessed.

There also are privacy problems with conventional targets such as, for example, a disk array. Specifically, the LUN in an access message may specify one or more disks in the disk array to store information from an initiator host computer system. In many such prior art bus systems, however, depending upon the bus protocol, the entire disk array is accessible (via the target controller) by all of the host computers connected to the bus, thereby limiting the privacy of the files stored in the disk array.

The art has responded to this privacy problem by partitioning disk arrays, for example, into a plurality of partitions, assigning a different array port (i.e., bus connection points) and target controller to each partition, and connecting an independent bus to each array port. Accordingly, a partition is accessible by those initiators only that are on the bus that is connected to the associated array port. This solution therefore requires that the disk array have the same number of ports as array partitions, as well as an equal number of busses. This requirement necessarily increases the ultimate cost of manufacturing and utilizing such network system.

SUMMARY OF THE INVENTION

In accordance with one aspect of the invention, a method, apparatus, and computer program product for controlling access to a target device utilizes an initiator bus identifier to either permit or deny access to a selected portion of the target device. To that end, a message having (among other data) an initiator identifier identifying the initiator is directed from the initiator device to the target device to request access to the selected portion of the target device. Upon receipt by the target device, it is determined if the initiator identifier is in a permitted set of initiator identifiers associated with the selected portion of the target device. If the initiator identifier is in the permitted set, then access to the portion of the target device is permitted and the initiator can access the target portion in accordance with conventionally known processes.

If the initiator bus identifier is not in the permitted set, then access to the selected portion of the target device is denied. If denied, then a denial message may be transmitted to the initiator device having notification data that the initiator identifier is not in the permitted set.

In accordance with another aspect of the invention, a target controller intercepts the message and transmits the message to the target device if the initiator identifier is in the permitted set of initiator identifiers. Although the permitted set of initiator identifiers may have as few as zero identifiers, some embodiments may include up to the total number of devices coupled to the bus.

In accordance with other aspects of the invention, the bus is a SCSI bus and the message includes a logical unit number associated with the selected portion of the target device. Moreover, the message may identify the bus and a target identifier identifying the target. The target device may be a disk array and the initiator device may be a computer system.

In accordance with still another aspect of the invention, a probe message is transmitted to the target device, where the probe message includes the initiator identifier. After the initiator identifier is determined, from the probe message, at least zero portions of the target device that are accessible to the initiator device are identified. A reply message then is produced and transmitted to the initiator device, where the reply message includes data identifying the at least zero portions of the target device that are accessible to the initiator device. In response to receipt of the reply message, the initiator device may produce an access message (having data identifying one or more of the at least zero portions of the target device that are accessible to the initiator device) requesting access to the target device. The access message may be transmitted to the target device, thereby causing the target device to permit access by the initiator device to the at least one or more of the at least zero portions of the target device.

In accordance with yet another aspect of the invention, the target device may be accessible by either one of a first initiator having a first configuration and a first initiator identifier, and a second initiator having a second configuration and a second initiator identifier. In preferred embodiments, a first driver is provided for interpreting the first configuration and facilitating access by the first initiator, and a second driver is provided for interpreting the second configuration and facilitating access by the second initiator. Access is permitted, via one of the two drivers, in response to receipt of an access message having one of the first initiator and second initiator identifier. Specifically, if the access message has the first initiator identifier, then the message is directed to the first driver for processing, thus facilitating access by the first initiator. In a similar manner, if the access message has the second initiator identifier, then the message is directed to the second driver for processing, thus facilitating access by the first identifier.

BRIEF DESCRIPTION OF THE DRAWINGS

The foregoing and other objects and advantages of the invention will be appreciated more fully from the following further description thereof with reference to the accompanying drawings wherein.

DESCRIPTION OF ILLUSTRATIVE EMBODIMENTS

Figure 1:
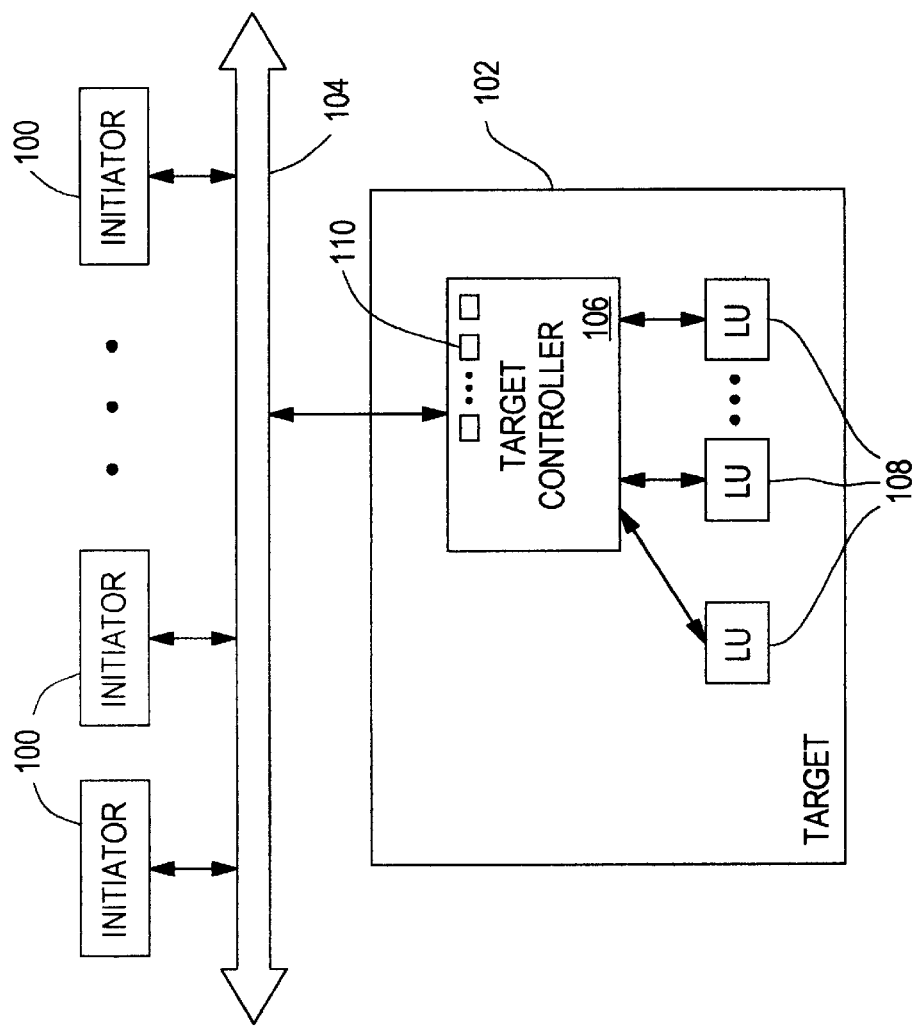
FIG. 1 schematically shows a preferred network system that may be utilized to implement a preferred embodiment of the invention.

FIG. 1 schematically shows a preferred network system that may be utilized to implement a preferred embodiment of the invention. The system includes a plurality of network devices, identified as initiators 100 and targets 102, that are interconnected by a network bus 104.

In preferred embodiments, the bus 104 is a small computer system interface bus ("SCSI bus"), and the network devices are preconfigured in accordance with the SCSI specification. The initiators 100 request access to the target 102 by directing access messages to the target 102 via the bus 104. Access messages include, among other things, an initiator identifier identifying the initiator, a target identifier identifying the target, and the portion of the target device 102 to be accessed ("logical unit 108", referred to in the figures as "LU"). The logical unit 108 is identified in the access message by a logical unit number ("LUN"). It should be noted that although only one target 102 is shown in the figures, any number of targets 102 may be utilized, including the initiators 100 which also can act as targets 102 to other initiators 100 and the target 102. It also should be noted that two devices considered to be "connected" are not necessarily directly connected and thus, may have additional circuit elements or devices between the two devices.

The target 102 preferably includes a target controller 106 for receiving and processing initiator messages, and a plurality of logical units 108 that are utilized and accessible by selected initiators 100. For example, the target 102 may be a redundant array of independent disks ("RAID"), commonly known as a disk array. In such case, the logical units 108 may be groups of disks in the disk array. The groups may range in size from zero disks (i.e., a null set) to all of the disks in the disk array. As shown in greater detail in FIG. 2, the target controller 106 processes the initiator messages and permits access to selected logical units 108 in the target 102. In preferred embodiments, the target controller 106 is implemented as firmware within the target 102.

In accordance with preferred embodiments of the invention, an initiator 100 may access only selected logical units 108 within the target 102. Depending upon the bus protocol used, those selected units may be groups of logical units 108 ranging in size from zero logical units 108 to every logical unit 108 in the target 102. In preferred embodiments, certain logical units 108 are accessible by one initiator 100 only, and certain other logical units 108 are accessible by multiple initiators 100 ("shared logical units").

Figure 2:
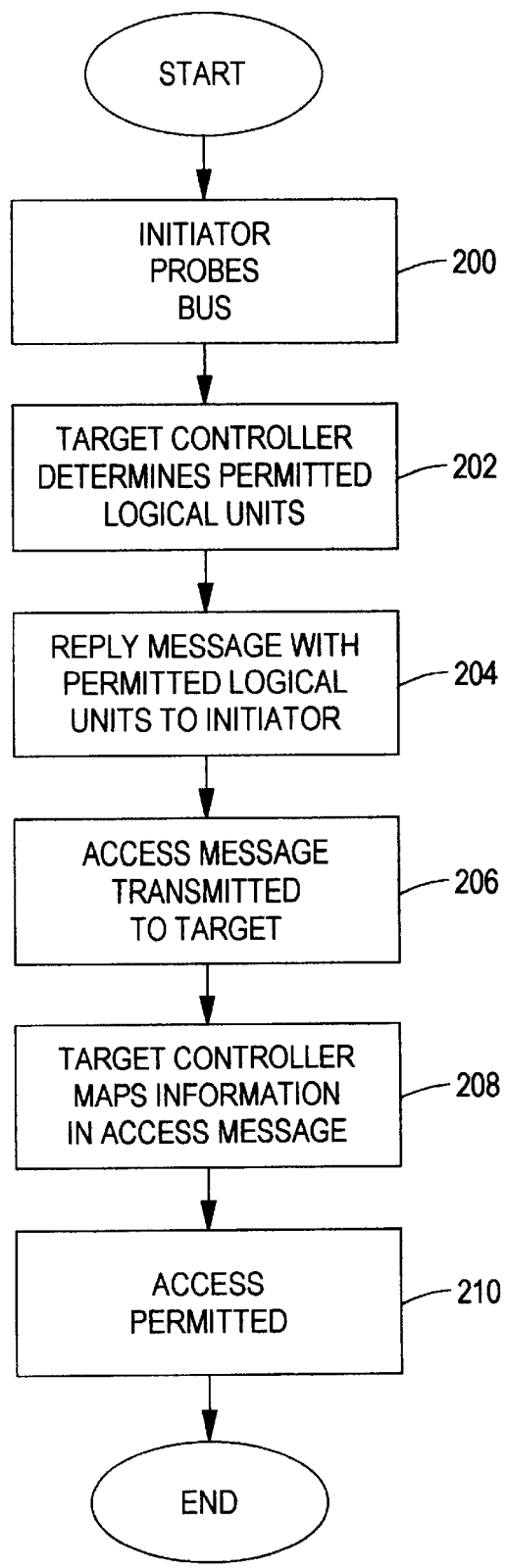
FIG. 2 is a flow chart showing the steps of a preferred embodiment of the invention for controlling access to target devices.

FIG. 2 is a flow chart showing a preferred method for controlling access to the logical units 108 within the target 102. In addition to depending upon the target identifier, access to the logical units 108 is dependent upon the initiator identifier. To that end, the process starts at step 200 in which the initiator 100 probes the bus 104 with a probe message to determine the target identifier and the logical units 108 associated with the target 102. As shown below, only certain logical units 108 within the target 102 are associated with the initiator 100. Upon receipt of the probe message, which includes the initiator identifier (e.g., the physical location of the initiator 100 on the bus 104), the target controller 106 determines which logical units 108 on the target 102, if any, are accessible by the specific initiator 100 making the request (step 202). This determination may be performed by accessing a data structure (e.g., a "look-up table") that specifies a permitted set of logical units 108 that are accessible by the specific initiator 100. For example, the initiator 100 may have access to a permitted set of logical units 108 having logical unit numbers four and six only. The look-up table thus also includes a set of initiator identifiers associated with each logical unit. Only those initiator identifiers in each set therefore may access their associated target logical unit. It should be noted that use of a look-up table is discussed for exemplary purposes and is not intended to limit the scope of the invention. Any conventional mechanism for determining the permitted set of logical units 108 therefore may be utilized.

The look-up data structure may be pre-configured by a system operator who assigns selected logical units 108 in the target 102 to each of the initiators 100. This preconfiguration preferably is performed when the target controller 106 is installed. When necessary, however, the look-up data structure may be reconfigured at any subsequent time, such as when new initiators 100 are added to the system, or when the logical units 108 must be reassigned to other initiators 100. In preferred embodiments, the target controller 106 has an associated graphical user interface that enables the system operator to easily configure or reconfigure the logical unit allocation within the system.

The process then continues to step 204 in which a reply message having the set of logical unit numbers that are accessible on the target 102 by the initiator 100 is transmitted to the initiator 100 via the bus 104. In so doing, the target 102 appears (to the initiator 100) to have only the set of logical units 108 in the reply message. Any other actual logical units 108 on the target 102 thus appear to be invisible to the initiator 100. This creates a "virtual" target for the initiator 100, where such virtual target has only those logical units specified in the reply message. When used with a SCSI bus, the logical unit numbers must be renumbered to include logical unit number zero. Accordingly, if the initiator 100 has access to logical unit numbers four and six, then the target controller 106 may renumber those logical unit numbers as zero and one, respectively, and store the corresponding actual logical unit numbers in local target memory for a subsequent mapping (discussed below with regard to step 208).

The process then continues to step 206 in which the reply message is received by the initiator 100, and an access message requesting access to the logical units 108 specified in the reply message is transmitted to the target 102. As noted above, the access message includes, among other things, the initiator identifier, the target identifier, and the logical unit numbers of the logical units 108 to which accessed is requested. In the above example, the access message may include logical unit numbers zero and one.

The target controller 106 then receives the access message and maps the logical unit numbers in the access message to the actual (physical) logical unit numbers of the target 102 (step 208). This mapping is performed based upon the initiator identifier. Continuing with the above example, the local target memory is accessed and the logical unit numbers in the access message (zero and one) are mapped to the actual logical unit numbers (four and six) in the target device 102.

Once the actual logical unit numbers are determined, then the process continues to step 210 in which access is permitted to the respective logical units 108 (e.g., actual target logical unit numbers four and six). The initiators 100 then access the logical units 108 in a conventional manner according to the SCSI protocol.

Figure 3:
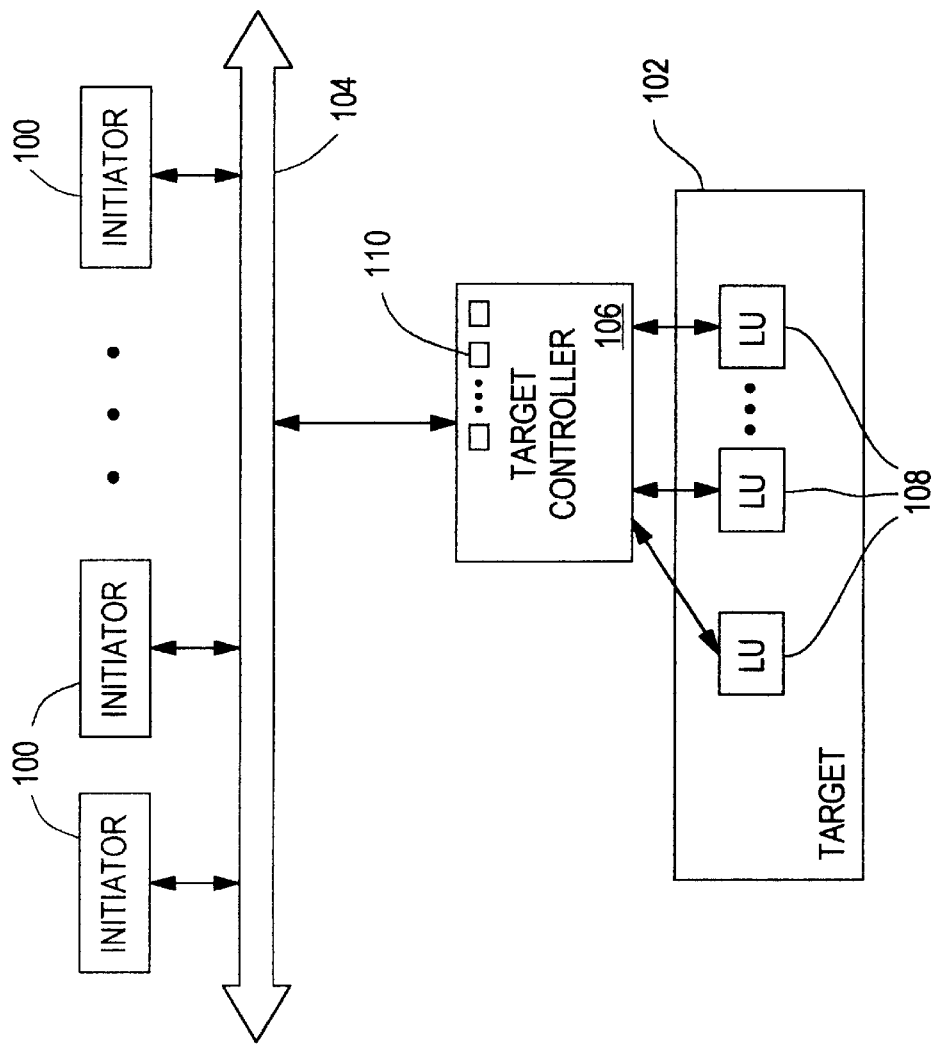
FIG. 3 schematically shows an alternative network system that may be utilized to implement a preferred embodiment of the invention.

FIG. 3 schematically shows an alternative network system that may be utilized to implement a preferred embodiment of the invention. Unlike the configuration shown in FIG. 1, this configuration includes a target controller 106 that is in a chassis that is separate from that of the target 102. The target controller 106 is electrically connected between the bus 104 and the target 102 to transmit and receive messages to and from the target 102. Although separate from the target 102, the target controller 106 functions substantially identically to that in the embodiment shown in FIG. 1.

Figure 4:
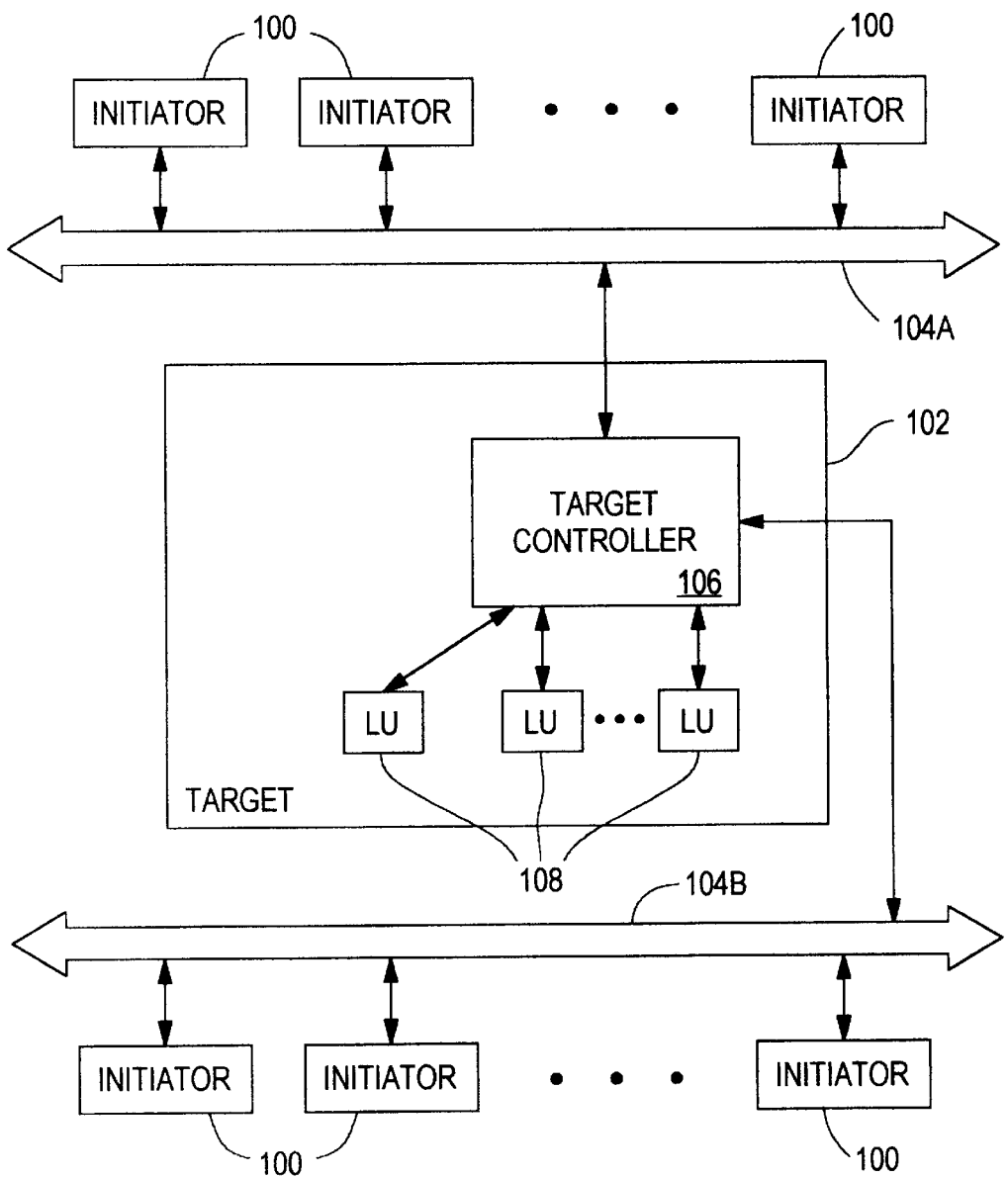
FIG. 4 shows another alternative network system that may be utilized to implement a preferred embodiment of the invention.

FIG. 4 shows another alternative network system that may be utilized to implement a preferred embodiment of the invention. More particularly, the target 102 is coupled to and accessible by two independent busses 104A and 104B that each have a set of initiators 100. The target controller 106 in this embodiment also functions substantially identically to that in the other embodiments in receiving access messages and determining if an initiator identifier is within the permitted set. For example, in addition to utilizing the initiator identifier, the target identifier, and the logical unit number (in a SCSI bus system), the controller 106 also utilizes a bus identifier to determine which initiator 100 on which bus is requesting access. Conflicts between two initiators attempting to simultaneously access a single logical unit 108 are resolved in accordance with the bus protocol specification. In other embodiments, more than two busses may be coupled to the target 102.

Although embodiments of the invention have been described in terms of the SCSI specification, it should be noted that other communication protocols may be utilized to implement the invention. For example, conventionally known peripheral connect interface ("PCI") and Fibre Channel protocols may be utilized.

Some embodiments of the invention do not probe the SCSI bus 104 (step 200 of FIG. 2) to determine the target identifier and the logical units 108 associated with the target 102. In such cases, the access message may include the actual logical unit numbers of the target 102 to which access is requested. The target controller 106 responsively accesses the look-up data structure to determine if the logical units 108 designated in the access message are in a permitted set of logical units 108 available to the initiator 100. Access then is permitted to the logical units 108, specified in the access message, that are in the permitted set. Access is denied, however, to those logical units 108 specified in the access message that are not in the permitted set. When access is denied, the target controller 106 may transmit a denial message to the initiator 100 indicating either that access to certain requested logical units 108 is denied, or that the requested logical units do not exist. Accordingly, in a similar manner to the process shown in FIG. 2, the initiator identifier is utilized to determine whether access to a logical unit 108 is permitted.

It is known in the art that a single target may be configured to respond to two or more target identifiers when used with conventional SCSI controller chips (e.g., a model number NCR534825 SYMBIOS™ chip, available from Symbios Logic Incorporated of Fort Collins, Colo.). For example, a single target device on a SCSI bus may be identified by first and second target identifiers and thus, appear to be two separate target devices. Accordingly, when used with preferred embodiments of the invention, the initiator identifier may be utilized in conjunction with the first target identifier to access a first set of logical units, and then used in conjunction with the second target identifier to access a second set of logical units.

Unlike prior art systems, initiators 100 having different protocol requirements (e.g., vendor unique behavioral variants) may be utilized with preferred embodiments of the bus system. To that end, each group of logical units 108 that may be accessed by each initiator 100 is viewed by the system as an independent virtual target 102. The target controller 106 thus preferably is preconfigured to include separate driver programs 110 that each are specific to the configuration of each initiator 100. As shown below in FIG. 5 (discussed below), selection of the appropriate driver program 110 for an initiator 100 is based upon the initiator identifier.

Accordingly, a single logical unit 108 included in two or more virtual targets 102 may be accessed in conformance with the configuration of the specific initiator 100 requiring access. For example, if a first initiator 100 having a first configuration and a second initiator 100 having a second (different) configuration each share a single logical unit 108, then the logical unit 108 responds according to the first configuration when the first initiator 100 is accessing it, and similarly responds according to the second configuration when the second initiator 100 is accessing it.

Figure 5:
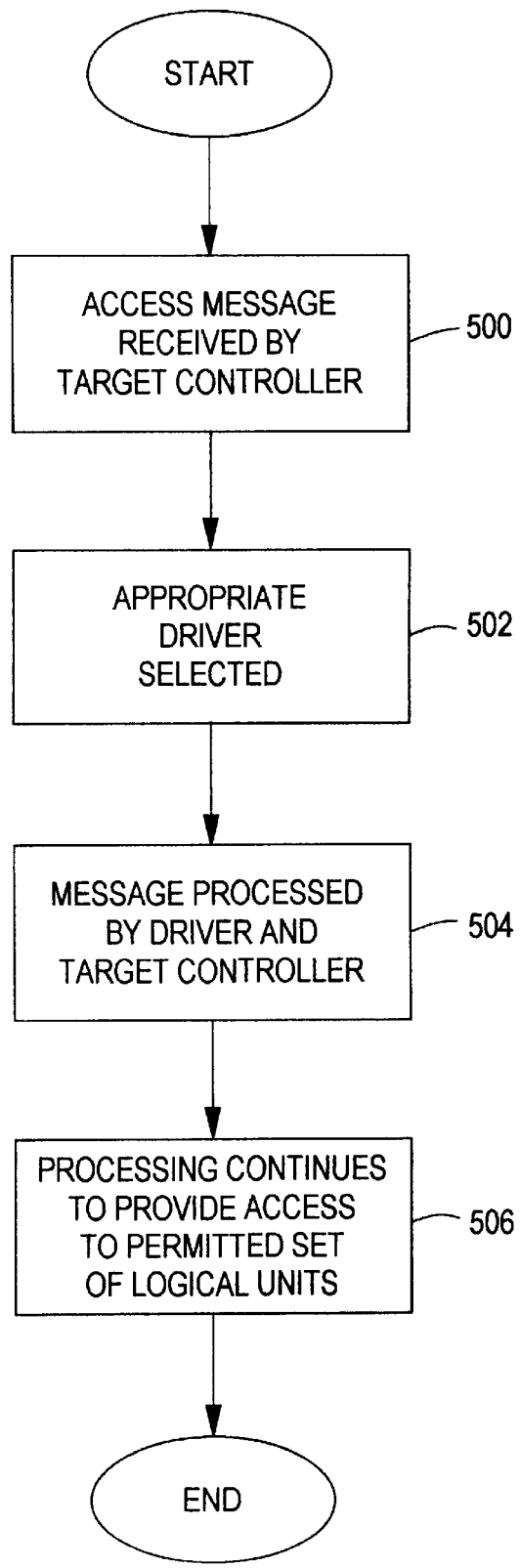
FIG. 5 shows a preferred process for accessing a target via a target controller that is compatible with initiators having different configurations.

FIG. 5 shows a preferred process for accessing a virtual target via a target controller 106 that is compatible with initiators 100 having different protocol requirements (configurations). The process begins at step 500 in which a message is received by the target controller 106 requesting access by a requesting initiator 100. At step 502, the target controller 106 extracts the initiator identifier from the message and determines which driver 110 corresponds to such initiator identifier. Such correspondence may be determined by accessing a look-up table in the local memory of the target controller 106. The target controller 106 then utilizes the driver 110 to process the access message (step 504), thus facilitating access by the initiator 100 in accordance with preferred embodiments of the invention (step 506).

In addition to solving privacy problems by assigning sets of logical units 108 to selected initiators 100, preferred embodiments of the invention enable a target 102 with many logical units to be more efficiently utilized. For example, a target 102 having thirty-two logical units and located on a narrow SCSI bus system may be fully utilized by four initiators 100 that each has eight different assigned logical units 108. For example, a first initiator 100 may have access logical units 0–7, a second initiator 100 may have access logical units 8–15, a third initiator 100 may have access to logical units 16–23, and a fourth initiator 100 may have access to logical units 24–31. Accordingly, a user may access any of the logical units 108 (e.g., disks on a disk array) by selecting the appropriate initiator 100. In some embodiments, each of the four initiators 100 may be accessible by one computer that coordinates interaction between each of the initiators 100. For example, each initiator may be a computer card within a computer system. In other embodiments, the four initiators 100 may be separate computer systems.

In an alternative embodiment, the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method of controlling access by an initiator device to a target device on a bus, the initiator device being identified by an initiator identifier, the initiator device producing a message that is transmitted to the target device, the message including the initiator identifier, the method comprising the steps of:

A. determining, in response to receipt of the message, if the initiator identifier is in a permitted set of identifiers associated with a selected portion of the target device; and B. denying access by the initiator device to the selected portion of the target device if it is determined that the initiator identifier is not in the permitted set of identifiers.

2. The method as defined by claim 1 wherein the message identifies the selected portion.

3. The method as defined by claim 1 further including the step of:

C. permitting access by the initiator device to the selected portion of the target device if it is determined that the initiator identifier is in the permitted set of identifiers.

4. The method as defined by claim 1 wherein step A comprises the steps of:

A1. identifying which portions of the target are accessible by the initiator device; and A2. determining if the selected portion of the target is identified in step A1.

5. The method as defined by claim 1 wherein the bus is a SCSI bus and the message includes a logical unit number associated with the selected portion of the target device.

6. The method as defined by claim 1 wherein the initiator identifier specifies the physical address of the initiator on the bus.

7. The method as defined by claim 1 wherein the target includes a target identifier identifying the target, the initiator being connected to the bus, the step of determining including the steps of:

A3. determining the identity of the bus; and

A4. determining the target identifier.

8. The method as defined by claim 1 wherein the permitted set of identifiers has no more than one identifier.

9. The method as defined by claim 1 wherein the target device is a disk array.

10. The method as defined by claim 1 wherein the message is received by a target controller, and further wherein the target controller permits access by the initiator if the initiator identifier is in the permitted set of identifiers.

11. The method as defined by claim 1 wherein the target device receives the message and performs step A.

12. The method as defined by claim 1 wherein the permitted set of identifiers includes a logical unit number zero.

13. An apparatus for controlling access by an initiator device to a target device on a bus, the initiator device being identified by an initiator identifier, the initiator device producing a message that is transmitted to the target device, the message including the initiator identifier, the apparatus comprising:

means for determining, in response to receipt of the message, if the initiator identifier is in a permitted set of identifiers associated with a selected portion of the target device; and means for denying access by the initiator device to the selected portion of the target device if it is determined that the initiator identifier is not in the permitted set of identifiers.

14. The apparatus as defined by claim 13 wherein the message identifies the selected portion.

15. The apparatus as defined by claim 13 further including:

means for permitting access by the initiator device to the selected portion of the target device if it is determined that the initiator identifier is in the permitted set of identifiers.

16. The apparatus as defined by claim 13 wherein the determining means comprises:

means for identifying which portions of the target are accessible by the initiator device; and means for determining if the selected portion of the target is identified by the identifying means.

17. The apparatus as defined by claim 13 wherein the bus is a SCSI bus and the message includes a logical unit number associated with the selected portion of the target device.

18. The apparatus as defined by claim 13 wherein the target device is a disk array.

19. The apparatus as defined by claim 13 wherein the target includes a target identifier identifying the target, the initiator being connected to the bus, the means for determining including:

means for determining the identity of the bus; and means for determining the target identifier.

20. The apparatus as defined by claim 13 wherein the permitted set of identifiers has no more than one identifier.

21. The apparatus as defined by claim 13 wherein the initiator identifier specifies the physical location of the initiator on the bus.

22. The apparatus as defined by claim 13 wherein the message is received by a target controller, and further wherein the target controller permits access by the initiator if the initiator identifier is in the permitted set of identifiers.

23. The apparatus as defined by claim 13 wherein the target device includes means for receiving the message and the determining means.

24. The apparatus as defined by claim 13 wherein the initiator has a specified configuration, the apparatus further including:

a driver having the specified configuration for processing messages received by the initiator; and means for associating the initiator identifier with the driver.

25. A computer program product for use on a computer system for controlling access by an initiator device to a target device on a bus, the initiator device being identified by an initiator identifier, the initiator device producing a message that is transmitted to the target device, the message including the initiator identifier, the computer program product comprising a computer usable medium having computer readable program code thereon, the computer readable program code including:

program code for determining, in response to receipt of the message, if the initiator identifier is in a permitted set of identifiers associated with a selected portion of the target device; and program code for permitting access by the initiator device to the selected portion of the target device if it is determined that the initiator identifier is in the permitted set of identifiers.

26. The computer program product as defined by claim 25 wherein the message identifies the selected portion.

27. The computer program product as defined by claim 25 further including:

program code for denying access by the initiator device to the selected portion of the target device if it is determined that the initiator identifier is not in the permitted set of identifiers.

28. The computer program product as defined by claim 25 wherein the program code for determining comprises:

program code for identifying which portions of the target are accessible by the initiator device; and program code for determining if the selected portion of the target is identified by the execution of the program code for identifying.

29. The computer program product as defined by claim 25 wherein the bus is a SCSI bus and the message includes a logical unit number associated with the selected portion of the target device.

30. The computer program product as defined by claim 25 wherein the target device is a disk array.

31. The computer program product as defined by claim 25 wherein the target includes a target identifier identifying the target, the initiator being connected to the bus, the program code for determining including:

program code for determining the identity of the bus; and program code for determining the target identifier.

32. The computer program product as defined by claim 25 wherein the permitted set of identifiers has no more than one identifier.

33. The computer program product as defined by claim 25 wherein the initiator identifier specifies the physical location of the initiator on the bus.

34. The computer program product as defined by claim 25 wherein the target device includes program code for receiving the message and the program code for determining.

35. A method of controlling access to a target device by an initiator device, the target device and initiator device each connected to a bus, the initiator device being identified by an initiator identifier, the initiator device producing a probe message that is transmitted to the target device, the probe message including the initiator identifier, the method comprising the steps of:

A. determining the initiator identifier from the probe message;

B. identifying, based upon the initiator identifier, at least zero portions of the target device that are accessible to the initiator device; and C. producing a reply message that is transmitted to the initiator device, the reply message identifying the at least zero portions of the target device that are accessible to the initiator device.

36. The method as defined by claim 35 whereby in response to receipt of the reply message by the initiator device, the initiator device produces an access message, the method further comprising the step of:

D. permitting access, by the initiator device, to the at least zero portions of the target device in response to receipt of the access message, the access message identifying the at least zero portions of the target device.

37. The method as defined by claim 36 wherein the bus operates in accord with a specified bus protocol, step B comprising the step of:

B1. mapping the initiator identifier to the at least zero portions of the target device; and B2. identifying the at least zero portions in accord with the bus protocol.

38. The method as defined by claim 35 wherein step B comprises the step of:

B1. locating an access set having data identifying any portion of the target to which the initiator may access.

39. An apparatus for controlling access to a target device by an initiator device, the target device and initiator device each connected to a bus, the initiator device being identified by an initiator identifier, the initiator device producing a probe message that is transmitted to the target device, the probe message including the initiator identifier, the apparatus comprising:

means for determining the initiator identifier from the probe message;

means for identifying, based upon the initiator identifier, at least zero portions of the target device that are accessible to the initiator device; and means for producing a reply message that is transmitted to the initiator device, the reply message identifying the at least zero portions of the target device that are accessible to the initiator device.

40. The apparatus as defined by claim 39 wherein the bus operates in accord with a specified bus protocol, the means for identifying including:

means for mapping the initiator identifier to the at least zero portions of the target device; and means for identifying the at least zero portions in accord with the bus protocol.

41. The apparatus as defined by claim 39 whereby in response to receipt of the reply message by the initiator device, the initiator device produces an access message, the apparatus further comprising:

means for permitting access, by the initiator device, to the at least zero portions of the target device in response to receipt of the access message, the access message identifying the at least zero portions of the target device.

42. The apparatus as defined by claim 39 wherein the identifying means comprises:

means for locating an access set having data identifying any portion of the target to which the initiator may access.

43. A computer program product for use on a computer system for controlling access to a target device by an initiator device, the target device and initiator device each connected to a bus, the initiator device being identified by an initiator identifier, the initiator device producing a probe message that is transmitted to the target device, the probe message including the initiator identifier, the computer program product comprising a computer usable medium having computer readable program code thereon, the computer readable program code including:

program code for determining the initiator identifier from the probe message;

program code for identifying, based upon the initiator identifier, at least zero portions of the target device that are accessible to the initiator device; and program code for producing a reply message that is transmitted to the initiator device, the reply message identifying the at least zero portions of the target device that are accessible to the initiator device.

44. The computer program product as defined by claim 43 wherein the bus operates in accord with a specified bus protocol, the program code for identifying including:

program code for mapping the initiator identifier to the at least zero portions of the target device; and program code for identifying the at least zero portions in accord with the bus protocol.

45. The computer program product as defined by claim 43 whereby in response to receipt of the reply message by the initiator device, the initiator device produces an access message, the computer program product further comprising:

program code for permitting access, by the initiator device, to the at least zero portions of the target device in response to receipt of the access message, the access message identifying the at least zero portions of the target device.

46. The computer program product as defined by claim 43 wherein the program code for identifying comprises:

program code for locating an access set having data identifying any portion of the target to which the initiator may access.

47. A target device for access by an initiator, the initiators being identified by an initiator identifier, the target device comprising:

a plurality of logical units;

means for ascertaining the initiator identifier; and a target controller including means for permitting access by the initiator to a permitted set of the plurality of logical units target, the permitted set being less than all of the logical units in the target, the target controller further including a memory for storing mapping data for mapping the initiator identifier to those logical units in the permitted set.

48. The target device as defined by claim 47 wherein the plurality of logical units are identified by the target by a first set of logical unit identifiers in a first format, the target device further including:

a receiving port for receiving a request message from initiators, each message including a second set of logical unit identifiers for identifying a set of logical units on the target to which access is requested by such initiator;

means for converting the identifiers in the second set of identifiers into the first format.

49. The target device as defined by claim 48 wherein the converting means converts at least one of the logical unit identifiers in the second set of identifiers into a logical unit number zero.

50. The target device as defined by claim 47 wherein the ascertaining means includes means for receiving a message from the initiator.

51. The target device as defined by claim 47 further including means for denying access if the initiator identifier is not mapped to the permitted set.

52. A method of controlling access to a target by two initiators on a bus, the first initiator having a first configuration and first initiator identifier, the second initiator having a second configuration and a second initiator identifier, the method comprising the steps of:

providing a first driver for interpreting the first configuration and facilitating access by the first initiator;

providing a second driver for interpreting the second configuration and facilitating access by the second initiator;

receiving an access message having one of the first initiator identifier and the second initiator identifier;

if the message has the first initiator identifier, directing the message to the first driver; and if the message has the second initiator identifier, directing the message to the second driver.

53. The method as defined by claim 52 further including the step of:

permitting access by the first initiator to the target if the initiator identifier in the message is the first initiator identifier.

54. The method as defined by claim 52 further including the step of:

permitting access by the second initiator to the target if the initiator identifier in the message is the second initiator identifier.

55. An apparatus for controlling access to a target by two initiators on a bus, the first initiator having a first configuration and first initiator identifier, the second initiator having a second configuration and a second initiator identifier, the apparatus comprising:

a first driver for interpreting the first configuration and facilitating access by the first initiator;

a second driver for interpreting the second configuration and facilitating access by the second initiator;

a receiver for receiving an access message having one of the first initiator identifier and the second initiator identifier;

means for directing the access message to the first driver if the access message has the first initiator identifier; and means for directing the access message to the second driver if the access message has the second initiator identifier.

56. The apparatus as defined by claim 55 further including:

means for permitting access by the first initiator to the target if the initiator identifier in the access message is the first initiator identifier.

57. The apparatus as defined by claim 55 further including:

means for permitting access by the second initiator to the target if the initiator identifier in the access message is the second initiator identifier.

58. A computer program product for use on a computer system for controlling access to a target by two initiators on a bus, the first initiator having a first configuration and first initiator identifier, the second initiator having a second configuration and a second initiator identifier, the computer program product comprising a computer usable medium having computer readable program code thereon, the computer readable program code including:

driver program code for interpreting the first configuration and facilitating access by the first initiator;

driver program code for interpreting the second configuration and facilitating access by the second initiator;

program code for receiving an access message having one of the first initiator identifier and the second initiator identifier;

program code for directing the message to the first driver if the message has the first initiator identifier; and program code for directing the message to the second driver if the message has the second initiator identifier.

59. The computer program product as defined by claim 58 further including:

program code for permitting access by the first initiator to the target if the initiator identifier in the message is the first initiator identifier.

60. The computer program product as defined by claim 58 further including:

program code for permitting access by the second initiator to the target if the initiator identifier in the message is the second initiator identifier.

61. A method of controlling access by an initiator device to a target device on a bus, the initiator device being identified by an initiator identifier, the method comprising:

receiving a message from the initiator device, the message including the initiator identifier and a request to access a selected portion of the target device;

determining, in response to receipt of the message, if the initiator identifier is in a permitted set of identifiers associated with the selected portion of the target device; and denying access by the initiator device to the selected portion of the target device if it is determined that the initiator identifier is not in the permitted set of identifiers.

62. The method as defined by claim 61 wherein the request to access the selected portion of the target device includes a first portion identifier identifying the selected portion of the target device.

63. The method as defined by claim 62 wherein the first portion identifier identifies a virtual portion of the target device, the method further comprising:

mapping the first portion identifier to an actual portion identifier, the actual portion identifier identifying the actual identity of the selected portion of the target device.

64. The method as defined by claim 61 wherein the bus comprises a plurality of ports, the initiator device being coupled with a first port on the bus, the target device being coupled with a second port on the bus.

65. The method as defined by claim 64 wherein the bus complies with the SCSI family of bus protocols.

* * * * *